March 29, 1949. D. ROBERTSON 2,465,981
ASSEMBLY FOR TEMPERATURE-RESPONSIVE DEVICES
Filed April 24, 1945 2 Sheets-Sheet 1
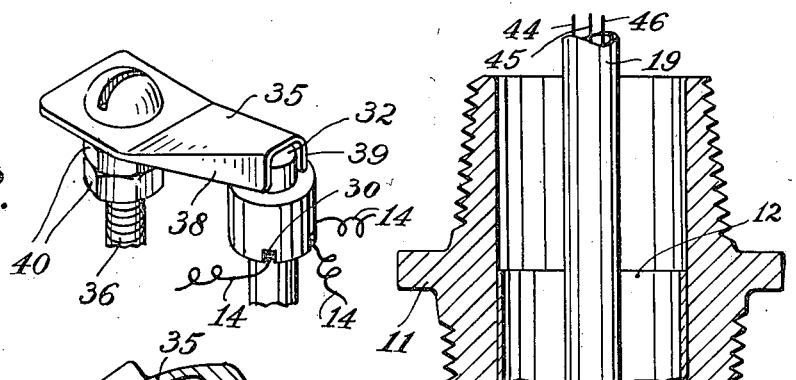
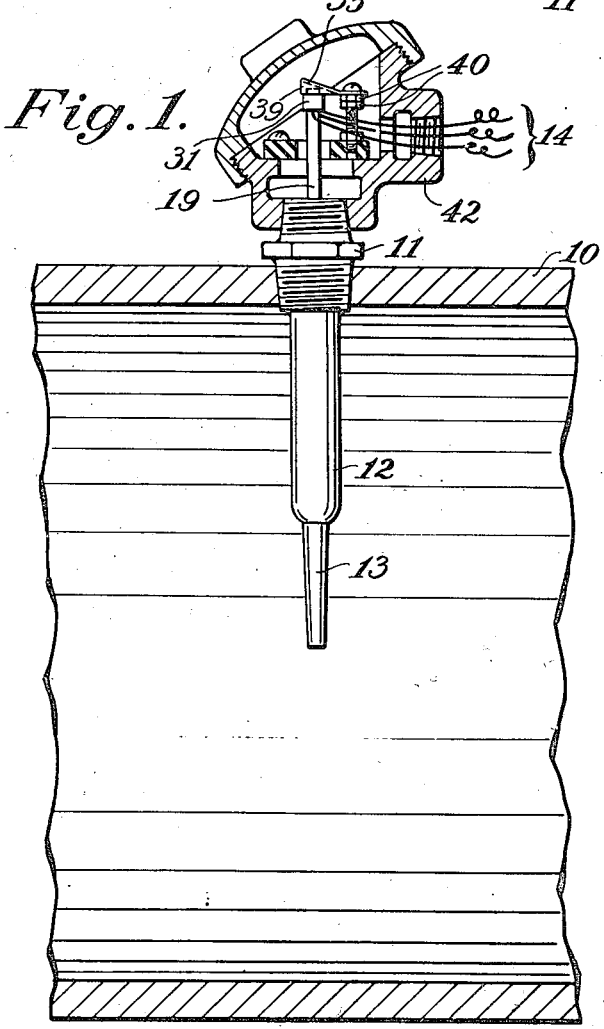
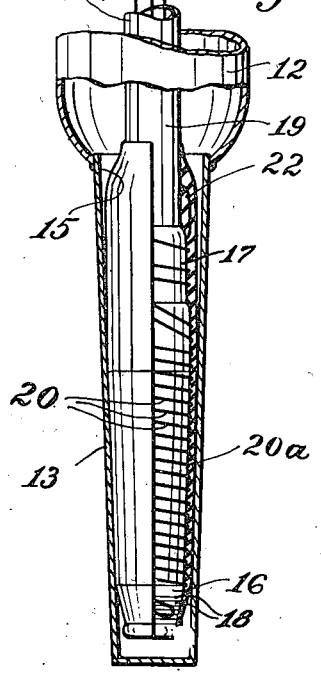
INVENTOR.
DONALD ROBERTSON
BY
Virgil E. Woodcock

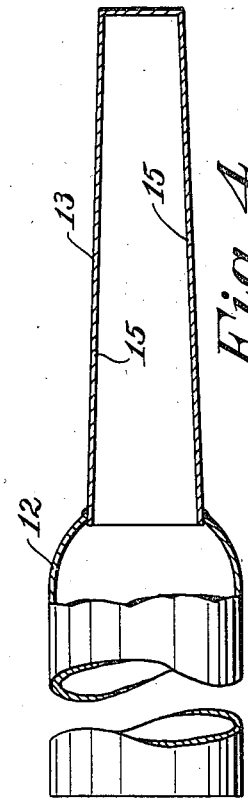
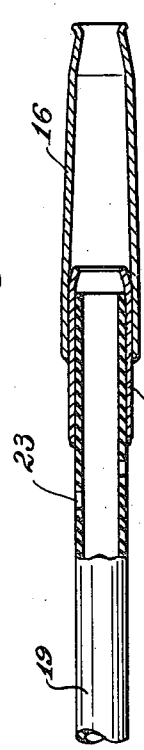
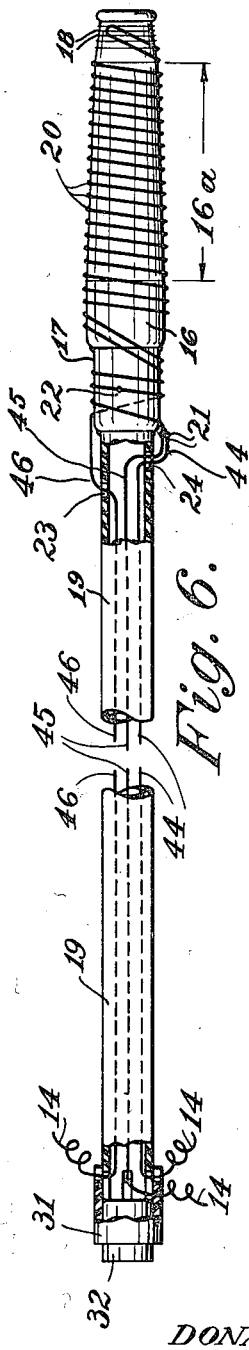
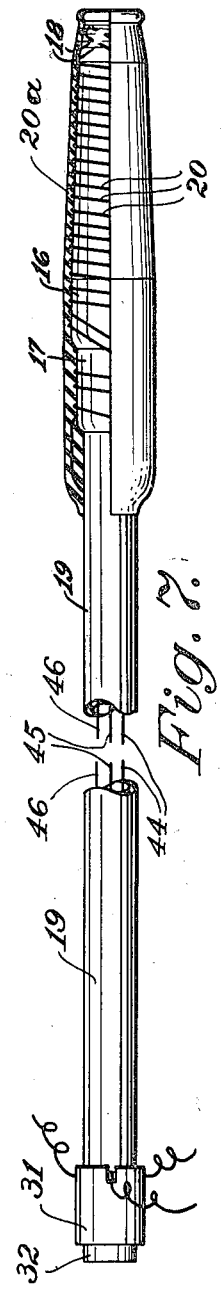
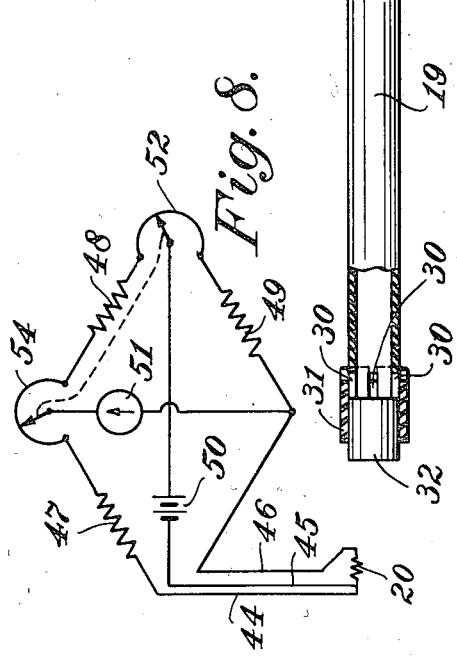
INVENTOR.
DONALD ROBERTSO
BY

Patented Mar. 29, 1949

2,465,981

UNITED STATES PATENT OFFICE 2,465,981

ASSEMBLY FOR TEMPERATURE-RESPONSIVE DEVICES

Donald Robertson, Philadelphia, Pa., assignor to Leeds and Northrup Company, Philadelphia, Pa., a corporation of Pennsylvania Application April 24, 1945, Serial No. 590,091

4 Claims. (Cl. 201—63)

This invention relates to assemblies for temperature-responsive devices, more particularly to resistance thermometers, and has for an object the provision of a resistance thermometer whose accuracy is maintained over a long period of time, and which may be readily removed from and reinserted in its housing without affecting its calibration or accuracy, which is unaffected by violent vibration, and which will rapidly follow a varying temperature.

In many measuring systems it has been desirable to utilize thermowells in order to isolate the temperature-responsive element from the fluid or material whose temperature is to be measured. Thermowells in general comprise a tube having a closed end disposed within the fluid or vessel whose temperature is to be measured. The thermowell may be carried by a fitting screwed into the wall of the vessel or container or the thermowell may be welded in place. In general, removable temperature-responsive elements are thermocouples or resistance thermometers. They have been disposed within thermowells with a somewhat indeterminate degree of contact with the wall of the thermowell. Thus, a time delay has been introduced because the temperature-responsive element does not reflect a change in temperature until the thermowell, and the air within it, has been brought to the new temperature. Moreover, the temperature-responsive elements themselves are somewhat delicate and excessive vibration greatly shortens their useful life.

In carrying out the present invention in one form thereof, there is provided a rugged mounting means for a temperature-responsive element which so supports it as to prevent any effect thereon by vibration. The temperature-responsive element may be readily removed and reinserted without affecting its accuracy. Intimate thermal contact is provided between the temperature-responsive element and the thermowell to minimize delay in response to changing temperatures. More specifically, a temperature-sensitive electrical resistance element is disposed between two complementarily tapered surfaces relatively movable with respect to each other. The resistance element is secured to one of the surfaces so that when they are moved toward each other a substantial mechanical support is provided while, at the same time, providing intimate thermal contact therebetween.

In a preferred form of the invention, the resistance wire comprising the sensitive element of a resistance thermometer is wound in bifilar relation around a slightly tapered and thin-walled cylinder of copper. This tapered cylinder is supported by means of an insulated tube through which the lead wires extend. The lower end of the thermowell is generally cylindrical but is provided with a taper complementary to that of the sensitive element so that the two surfaces may be rotated into and out of intimate thermal contact.

For a more complete understanding of the invention and for further objects and advantages thereof, reference should now be had to the accompanying description taken in conjunction with the drawings, in which:

Fig. 1 is a side view, partly in section, of one form of the invention as applied to the measurement of the temperature of a fluid in a pipe;

Fig. 2 is a side view, partly in section, of a thermowell embodying the invention;

Fig. 3 is a perspective view of the retaining means;

Fig. 4 is a view, partly in section, of one end of the thermowell;

Fig. 5 is a view, partly in section, of the framework of the sensitive element;

Fig. 6 is a view, partly in section, of the framework with the temperature-sensitive element and lead wires in place;

Fig. 7 is a view, partly in section, of the completed sensitive element; and

Fig. 8 is a schematic electrical diagram illustrating the general features of a preferred measuring system.

Referring to the drawings, there is fractionally illustrated, Fig. 1, a pipe 10 through which there may flow a fluid whose temperature is to be measured. The pipe 10 is provided with a threaded opening to receive a fitting 11. Suitably secured to it is a pipe 12. There is secured to the lower end of pipe 12, as by hard-soldering or brazing, a tube 13 of reduced diameter and closed at its lower end. It is constructed in accordance with the present invention. The temperature-responsive element is disposed within the tube 13. Lead wires extending therefrom are illustrated at 14. The tube 13, Fig. 2, has the interior surface 15 thereof tapered from the open end toward its closed end. The interior surface 15 is of frustro-conical shape. The sensitive element has an outer surface 20a of frustro-conical shape, and complementary to the surface 15. These complementarily tapered surfaces may taper at any desired degree with respect to their common axis. In one modification of the invention, a taper of .013 inch per inch was found satisfactory.

The sensitive element includes a thin-walled copper tube or support 16 attached to an inner tubular member 17, also of copper. Their adjacent surfaces are soldered together. The member 17 is fastened to, and supported on, a tubular insulating member 19 through which there may extend lead wires. As shown in Fig. 5, that part of the tube or support 16 to the right of the end of the inner tube 17 is tapered or of frustro-conical shape. Around the tapered surface is wound in bifilar relation resistance wire 20. As shown in Fig. 6, the right-hand end of the wire 20 is bound to the further reduced end-portion by any suitable means such as raw silk fibres 18. The wire, preferably insulated as by enamel, is then wound about the tube 16 with the turns thereof touching each other throughout the length of the tapered surface 16a. Immediately thereafter, the wire is carried over to the supporting member 17 where it is joined to lead wires 44, 45, and 46, a few turns being taken around member 17. As shown, the lead wires 44 and 45 are joined together and to one end of the resistance wire 20 at the point 21 while the lead wire 46 is joined to the other end of the resistance wire at the point 22. The exact location of the points 21 and 22 is determined during the calibration and adjustment of the sensitive element. The lead wires 44 and 45 extend through a hole 24 in the insulated tube 19 while the lead wire 46 extends through a hole 23.

After calibration and adjustment the resistance wire 20 and the exposed ends of the lead wires are dipped in a suitable insulating material such as varnish, and baked. A sufficient number of coats of heat-resistant insulating material or varnish are applied to provide a smooth surface of constant maximum thickness. The valleys between the turns of wire are filled. The result is that the outer surface is smooth and hard and has a taper complementary to that of the tube 16 and to that of the surface 15 of the thermowell 13.

The lead wires extend outwardly through slots 30 provided in the left-hand end of the tubular member 19, Fig. 5. A sleeve 31 is arranged to slip over the end of the tube 19. The sleeve 31 is provided with slots 30 and a plug 32 is disposed within the sleeve and against the end of the member 19. The sleeve 31 and the plug 32 are adhesively secured together and to the tubular member 19.

The sensitive element as illustrated in Fig. 7 is rugged and may be readily handled as a unit. It is placed into the position shown in Fig. 2 by inserting the lower end thereof into the tapered thermowell 13. As the two tapered surfaces contact each other the insulating tube 19 is pushed and rotated to provide intimate mechanical and thermal contact therebetween. The taper of the contacting surfaces is fairly small. The result is a wedging and wiping action. The wedging is adequate securely to hold the element tightly against the surface 15. Moreover, the whole length of the resistance wire 20 in the region 16a, Fig. 6, is supported by the surface 15. Thus, the sensitive element is so supported as not to be adversely affected by vibration and the like.

Though unnecessary for many applications, there has been illustrated in Figs. 1 and 3 a spring member 35 carried by a supporting screw 36 arranged to bear downwardly on the upper end of the tubular member 19 to prevent movement of the sensitive element relative to the frustro-conical surface 15 regardless of rough handling or shocks which otherwise might dislodge it. The spring 35 is provided with a pair of down-turned ears 38 and 39 disposed on opposite sides of the plug 32. Consequently, the spring member 35 may be loosely mounted above lock nuts 40 so that the free end of the spring member 35 may be lifted and swing into and out of engagement with the plug 32. However, when the spring member 35 is moved into the illustrated position, Figs. 1 and 3, the down-turned ears 38 and 39 prevent dislodgement therefrom and yet the spring member is effective in applying a force lengthwise of the insulating member 19. Of course, the lock nuts 40 may be tightened to clamp the spring member 35 against the head of the screw 36. The spring member 35 also provides for the relative lengthwise or longitudinal expansions of the removable element and the thermowell.

In the preferred form of the invention, the three lead wires extend through the insulating member 19 and outwardly through the housing 42. These lead wires 44, 45 and 46, Fig. 8, lead to a measuring circuit of the Wheatstone bridge type. As shown, the sensitive element 20 forms the resistance in one arm of the bridge while fixed resistors 47, 48 and 49 are provided in the remaining three arms of the bridge. A battery 50 is connected across one pair of conjugate points while a galvanometer or detector 51 is connected across the opposite pair of conjugate points. A slidewire 52 is connected between resistors 48 and 49 while a slidewire 54 is connected between resistors 47 and 48. These two slide-wires are simultaneously adjustable to bring the bridge into balance for the measurement of the temperature to which the sensitive element 20 may be subjected. For a more detailed description of this measuring circuit reference may be had to Leeds Patent No. 1,097,651.

While the resistance wire 20 has been described as being wound on the outside of the frustro-conical surface 16 and a coating applied to provide a smooth frustro-conical surface thereon, it is to be understood that the frustro-conical surface 16 may be provided with a spiral groove in which the resistance wire 20 may be disposed. Such recesses would then be filled with heat-resisting insulating material if desired, but the frustro-conical surface of the member 16 would then be in direct contact with the complementary frustro-conical surface 15 of the thermowell 13.

While there has been described a preferred embodiment of the invention, it will be understood that further modifications may be made without departing from the spirit and scope of the invention as set forth in the appended claims.

What is claimed is:

1. A temperature-sensitive device comprising a thermowell having its closed end-portion tapered, a removable temperature-responsive assembly disposed therein, said assembly comprising a supporting member with an end-portion tapered and complementary to said closed end-portion, resistance wire wound on said tapered portion of said supporting member, a heat-resistant coating covering said wire and presenting a smooth tapered surface for wiping engagement with the inner tapered surface of said closed end-portion, an insulating tube rigidly secured to said supporting member and extending outwardly of said thermowell, and means engaging said insulating tube for applying a spring bias in a direction to maintain said tapered surfaces in intimate engagement.

2. A temperature-sensitive device comprising a hollow outer supporting member having an elongated frustro-conical inner surface, slightly tapered from one end to the other end thereof, a temperature-responsive assembly disposed therein, said assembly comprising an inner supporting member having a tapered outer surface of frustro-conical shape, electrically insulated temperature-responsive resistance wire uniformly distributed around and lengthwise of said tapered outer surface to form a tapered coil, a coating of uniform maximum thickness covering said coil and filling the space between adjacent turns to form a continuously smooth tapered surface complementary to said inner surface for transfer of heat from said inner surface to said outer surface and throughout the length of said coil of temperature-responsive resistance wire.

3. For use with a tapered hollow outer supporting member having an elongated frustro-conical inner surface slightly tapered from one end to the other, a sensitive element for a resistance thermometer comprising an inner supporting member having a tapered outer surface of frustro-conical shape, electrically insulated temperature-responsive resistance wire uniformly distributed around and lengthwise of said tapered outer surface in bifilar relation to form a tapered coil, a heat-conductive coating of uniform maximum thickness covering said coil and filling the space between adjacent turns to form a continuously smooth tapered surface complementary to that of said outer member for transfer of heat to said outer surface and throughout the length of said coil of temperature-responsive resistance wire.

4. A temperature-sensitive device comprising a thermowell having its closed end-portion tapered, a removable temperature-responsive assembly disposed therein, said assembly comprising a supporting member with the outer surface of an end-portion tapered and complementary to the taper of said closed end-portion, electrically insulated temperature-responsive resistance wire uniformly distributed around and lengthwise of said tapered outer surface in bifilar relation to form a tapered coil, a heat-resistant and heat-conductive coating covering said wire and presenting throughout the length of said coil a smooth tapered surface complementary to that of said closed end-portion, a member insulated from and supporting said coil and extending axially from it, and a spring engaging said supporting tube for biasing said assembly towards the closed tapered end-portion of said thermowell.

DONALD ROBERTSON.

REFERENCES CITED

The following references are of record in the file of this patent:

UNITED STATES PATENTS

| Number | Name | Date |
| --- | --- | --- |
| 1,232,451 | Misland | July 3, 1917 |
| 1,308,994 | Ronne | July 8, 1919 |
| 1,363,474 | Kuhn et al. | Dec. 28, 1920 |
| 2,102,030 | Quereau | Dec. 14, 1937 |
| 2,113,610 | Bacon | Apr. 12, 1938 |
| 2,135,078 | Hubbard et al. | Nov. 1, 1938 |
| 2,156,826 | Ullman | May 2, 1939 |